Aug. 15, 1933.  K. F. MARX  1,922,055
HYDROELECTRIC POWER GENERATOR
Filed Feb. 6, 1931
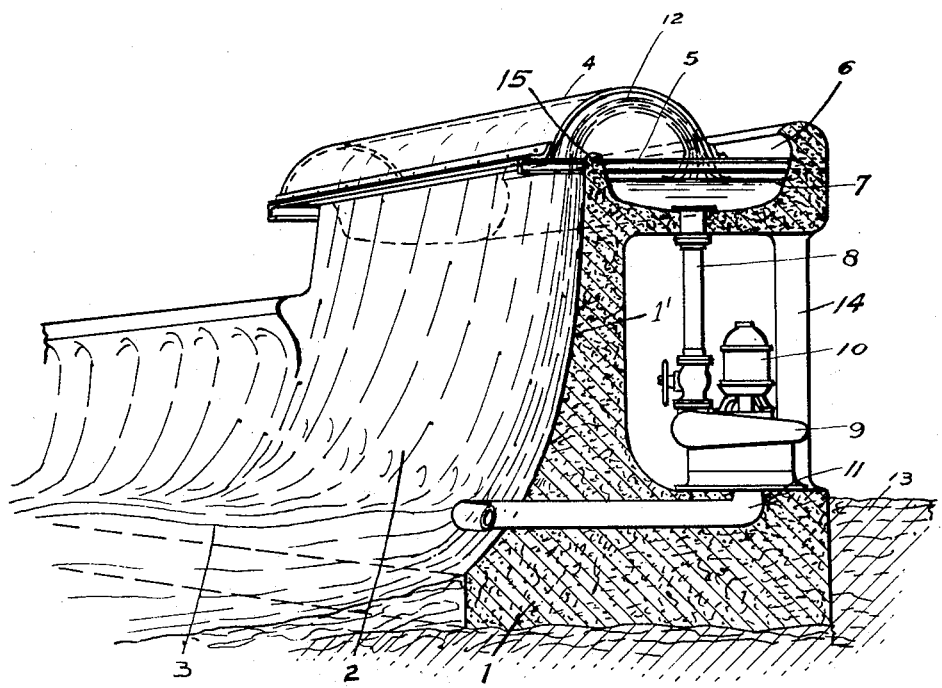
INVENTOR
KARL FREDERICK MARX.
BY
ATTORNEYS Patented Aug. 15, 1933

1,922,055

UNITED STATES PATENT OFFICE 1,922,055

HYDROELECTRIC POWER GENERATOR

Karl Frederick Marx, Dearborn, Mich.

Application February 6, 1931. Serial No. 514,027

1 Claim. (Cl. 61—20)

The present invention pertains to a novel hydro-electric power generator of a type adapted to be operated by shoreward moving waves of an ocean or similar large body of water.

The primary object of the present invention is to generate electricity with a device that utilizes the power of shoreward moving waves of a large body of water and to attain this object the invention provides a specially constructed breakwater or sea wall which traps water in a reservoir located at a level higher than the normal water level so that the water in flowing back to its normal level by force of gravity may be passed through water turbines which in turn drive electric current generators.

With the above and other ends in view the invention consists in matters hereinafter set forth and more particularly pointed out in the appended claim, reference being had to the accompanying drawing in which the single view is a cross sectional prospective view of the present device.

Like characters of reference are employed throughout to designate the corresponding parts.

The numeral 1 indicates a sea wall or breakwater, preferably constructed of reinforced concrete and resting upon the ocean bed or ground surface 13. The face of the breakwater which is facing seaward is provided with a curve 1' which acts as a deflector tending to cause inflowing waves to ride upwardly thereon and splash over the top of the breakwater. A deflector 4 formed in the nature of a curved plate is supported in spaced relation above the curved breakwater 1' by means of suitable cross beams 5.

A basin or reservoir 6 is formed in the top of the breakwater and the numeral 7 indicates the normal water level therein. A pipe 8 is connected at its upper end to this water basin or reservoir and its lower end is connected to a water turbine 9 to which is connected an electric current generator 10. An outlet pipe 11 is connected to the outlet of the turbine and leads outwardly through the breakwater to the main body of water.

The breakwater is preferably constructed so that the turbine and power generator may be located directly underneath the reservoir, the latter being suitably supported at its rear edge by the upright members 14.

In operation the incoming waves roll against the breakwater and the curved face 1' deflects the water and gives it an upward course, causing it to be elevated to a height greater than that of the breakwater. The curved deflector 4 then serves as a splash guard and deflects the course of the water over the portion 15 of the breakwater into the reservoir 6. From the reservoir the water flows by force of gravity through the pipe 8 to rotate the turbine 9 and generator 10 and then flows through the pipe 11 back to the main body of water.

In certain localities the ocean waves are fairly constant and therefore the reservoir may be constructed of sufficient size to maintain a constant level as indicated at 7. Over activity of the waves cannot have any detrimental effect upon the device however, for if the water in the reservoir reaches too high a level it may flow back over the portion 15 of the wall with the receding waves.

Although a specific embodiment of the present invention has been illustrated and described it is to be understood that various changes may be made in the details of construction without departing from the spirit of the invention as set forth in the appended claim, and such changes are contemplated.

What I claim is:

A sea wall having a substantially vertical front face, a basin like depression formed in the top of said wall, and an inverted substantially U-shaped plate suported above and spaced from said sea wall with the front edge extending outwardly in front of said wall and with its rear edge extending over said basin like depression.

KARL FREDERICK MARX.